(12) United States Patent
Hartman

(10) Patent No.: US 10,184,567 B2
(45) Date of Patent: Jan. 22, 2019

(54) SPRING RING VALVE SEAT AND BUTTERFLY VALVE WITH SPRING RING VALVE SEAT

(71) Applicant: Thomas A. Hartman, St. Louis, MO (US)

(72) Inventor: Thomas A. Hartman, St. Louis, MO (US)

(*) Notice: Subject to any disclaimer, the term of this patent is extended or adjusted under 35 U.S.C. 154(b) by 75 days.

(21) Appl. No.: 15/210,528

(22) Filed: Jul. 14, 2016

(65) Prior Publication Data

US 2017/0016540 A1 Jan. 19, 2017

Related U.S. Application Data

(60) Provisional application No. 62/192,436, filed on Jul. 14, 2015.

(51) Int. Cl.
*F16K 1/226* (2006.01)

(52) U.S. Cl.
CPC .................................. *F16K 1/2261* (2013.01)

(58) Field of Classification Search
CPC ...... F16K 1/2261; F16K 1/228; F16K 1/2263; F16K 5/0684; F16K 5/0689
USPC ... 251/306–307, 314–317.01, 174, 176, 177, 251/180; 277/644
See application file for complete search history.

(56) References Cited

U.S. PATENT DOCUMENTS

| | | | | |
|---|---|---|---|---|
| 3,077,331 | A * | 2/1963 | Wilson | F16K 1/2285 251/173 |
| 3,834,663 | A * | 9/1974 | Donnelly | F16K 1/2285 251/173 |
| 4,247,079 | A * | 1/1981 | Friess | F16K 1/2266 251/174 |
| 4,394,003 | A * | 7/1983 | Whitaker | F16K 1/2266 251/173 |
| 4,415,170 | A | 11/1983 | Bonafous | |
| 4,418,889 | A | 12/1983 | Krause | |
| 4,477,057 | A | 10/1984 | Friess | |
| 4,744,572 | A | 5/1988 | Sahba et al. | |
| 5,535,986 | A * | 7/1996 | Hutchens | F16K 1/2266 251/171 |
| 5,655,752 | A * | 8/1997 | De Villepoix | F16J 15/0893 251/174 |
| 2010/0044373 | A1 | 2/2010 | De Muinck et al. | |
| 2011/0284784 | A1* | 11/2011 | Abel | F16K 5/0689 251/180 |

(Continued)

*Primary Examiner* — Marina Tietjen
(74) *Attorney, Agent, or Firm* — Thompson Coburn LLP

(57) ABSTRACT

A butterfly valve has a housing that has an annular valve seat and a butterfly disk that has an annular valve seat. At least one of the valve seats is a spring seat that has an annular mounting portion and an axially opposite annular engagement portion. The engagement portion is configured to contact the other valve seat and resiliently deform radially under hoop stress caused by the contact as the butterfly disk moves to the closed position. The engagement portion is connected to the main body of the respective one of housing or the butterfly disk by the mounting portion. The mounting portion is attached to the main body of the respective one of housing or the butterfly disk in a manner such that the mounting portion can articulate relative to the main body of the respective one of housing or the butterfly disk as the engagement portion resiliently deforms radially.

8 Claims, 4 Drawing Sheets

(56) References Cited

U.S. PATENT DOCUMENTS

2012/0319022 A1   12/2012  Helfer et al.
2013/0087734 A1*  4/2013  Duboy ................. F16J 15/0887
                                                                       251/357

* cited by examiner

SPRING RING VALVE SEAT AND BUTTERFLY VALVE WITH SPRING RING VALVE SEAT

CROSS-REFERENCE TO RELATED APPLICATIONS

This application claims priority to U.S. Provisional Patent Application Ser. No. 62/192,436, filed Jul. 14, 2015.

STATEMENT REGARDING FEDERALLY SPONSORED RESEARCH OR DEVELOPMENT

Not Applicable.

APPENDIX

Not Applicable.

BACKGROUND OF THE INVENTION

Field of the Invention

This invention relates generally to large industrial valves for controlling the flow of fluids therethrough. More particularly, this invention pertains to butterfly valves having a metal spring ring valve seat that resiliently deforms radially under hoop stress when seated to thereby create a tight seal when the valve is closed.

General Background

Butterfly valves are used in various industries for controlling the flow of fluids. Butterfly valves are often used in situations wherein the flow through the valve must be throttled. An advantage of using a butterfly valve over other types of throttling valves is that the torque across the butterfly disk of such valves resulting from fluid pressure is generally balanced, thereby making such valves ideal for controlling high pressure fluids (e.g., water flow from damns).

Large butterfly valves typically have replaceable valve seats (one mounted to the housing and the other to the butterfly disk). The valve seat may be metal or polymeric. In some valves, at least one of the seats may be movable with respect to the disk or housing to which it is secured to ensure complete sealing when closed.

The present invention pertains to a metal butterfly valve seat that can articulate, but in a unique manner.

SUMMARY OF THE INVENTION

In one aspect of the invention, a butterfly valve comprises a housing and a butterfly disk. The housing comprises a main body and an annular valve seat. The housing defines a fluid passageway that extends through the main body and the valve seat. The butterfly disk comprises a main body and an annular valve seat and is pivotally mounted to the housing such that the butterfly disk is movable to and between an open position and a closed position. The butterfly disk is configured to prevent fluid from passing through the fluid passageway of the housing when the butterfly disk is in the closed position. At least one of the valve seats is a spring seat that has a cross-section that extends three-hundred and sixty degrees about an axis. The spring seat has an annular mounting portion and an axially opposite annular engagement portion. The engagement portion is configured to contact the other of the valve seats and resiliently deform radially under hoop stress caused by the contact as the butterfly disk moves to the closed position. The engagement portion is connected to the main body of the respective one of housing or the butterfly disk by the mounting portion. The mounting portion is attached to the main body of the respective one of housing or the butterfly disk in a manner such that the mounting portion can articulate relative to the main body of the respective one of housing or the butterfly disk as the engagement portion resiliently deforms radially.

In another aspect of the invention, an annular valve seat has a cross-section that extends three-hundred and sixty degrees about an axis. The cross-section comprises a mounting portion and an engagement portion. The engagement portion extends axially in an arcuate and elongate manner from the mounting portion. The mounting portion has a periphery. The periphery of the mounting portion has a semi-circular portion.

Yet another aspect of the invention pertains to a butterfly valve comprising a housing and a butterfly disk. The housing comprises a main body and an annular valve seat. The housing defines a fluid passageway that extends through the main body and the valve seat. The butterfly disk comprises a main body and an annular spring seat. The butterfly disk is pivotally mounted to the housing such that the butterfly disk is movable to and between an open position and a closed position. The butterfly disk is configured to prevent fluid from passing through the fluid passageway of the housing when the butterfly disk is in the closed position. The main body of the butterfly disk comprises an annular recess that has a semi-circular cross-section. The spring seat has an annular mounting portion and an axially opposite annular engagement portion. The engagement portion is configured to contact the valve seat of the housing and resiliently deform radially under hoop stress caused by the contact as the butterfly disk moves to the closed position. The mounting portion comprises an annular protrusion having a semi-circular cross-section. The annular protrusion of the mounting portion of the spring seat is at least partially positioned within the recess of the main body of the butterfly disk such that the spring seat is secured to the main body of the butterfly disk but can articulate therein.

Further features and advantages of the present invention, as well as the operation of the invention, are described in detail below with reference to the accompanying drawings.

Figure 1:
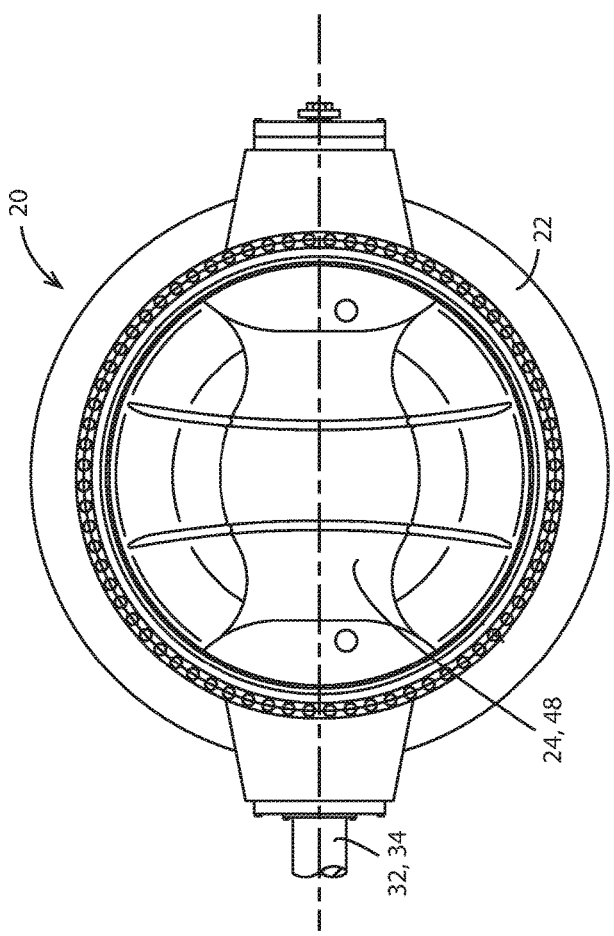
FIG. 1 depicts a downstream end view of a butterfly valve in accordance with the invention.
Figure 2:
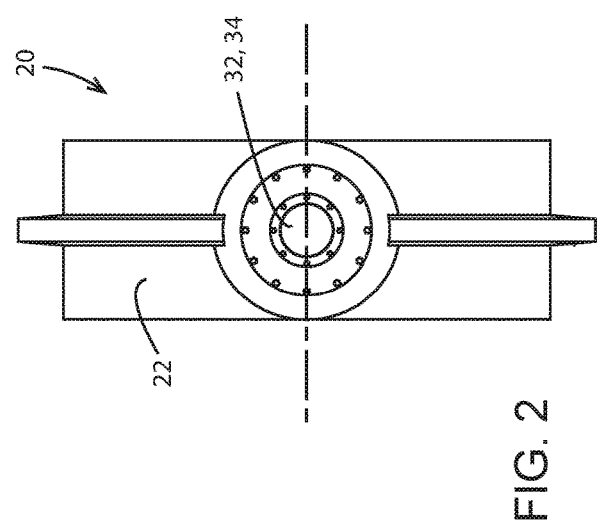
FIG. 2 depicts a side view of the butterfly valve shown in FIG. 1 from the side of the valve comprising the driveshaft.
Figure 3:
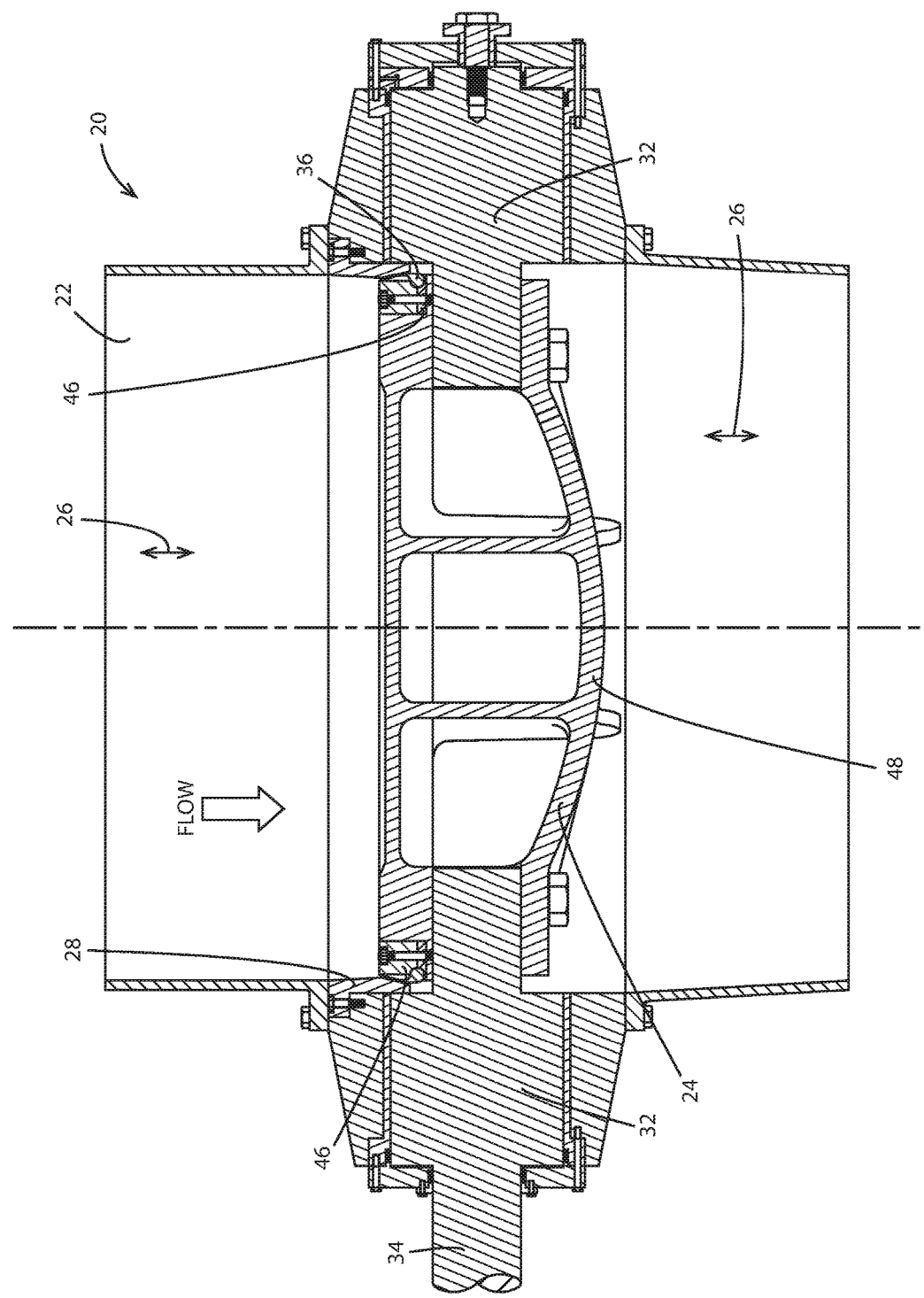
FIG. 3 depicts a cross-section of the butterfly valve shown in FIGS. 1 and 2 taken about a plane comprising the driveshaft axis and the main flow axis of the valve.

Reference numerals in the written specification and in the drawing figures indicate corresponding items.

DETAILED DESCRIPTION

A butterfly valve (20) in accordance with the invention is shown in the drawing figures. The butterfly valve (20) comprises a housing (22) and a butterfly disk (24). The housing (22) comprises a fluid passageway (26) and is configured to pivotally support the butterfly disk (24). The housing also comprises an annular valve seat (28). The valve seat (28) preferably has a frustoconical engagement surface (30).

The butterfly disk (24) is pivotally supported by the housing (22) a pair of trunnions (32). One of the trunnions (32) forms or is connected to a driveshaft (34) for applying torque to pivot the butterfly disk (24) between its open and closed positions within the housing (22). The upstream side of the butterfly disk (24) comprises an annular spring seat (36). Obviously, in the open position (not shown), the butterfly disk (24) is oriented parallel to the fluid passageway (26) and thereby allows fluid to pass through the valve (20), while in the closed position the butterfly disk is pivoted such that it is oriented perpendicular to the fluid passageway and thereby prevents fluid from passing through the valve.

The heart of the invention lies in the spring seat (36). As is shown most clearly in FIG. 4, the spring seat (36) has a cross-section that resembles a musical quarter note symbol and has a mounting portion (38) and an engagement portion (40). The engagement portion of the spring seat (36) extends in the axial direction (i.e., parallel to the axis of symmetry of the spring seat) and has a cross-section that curves gently as it extends away from the mounting portion (38). As is explained in greater detail below, the convex side (42) of the engagement portion (40) faces and contacts the engagement surface (30) of the valve seat (28) of the housing (22) when the butterfly disk (24) is in the closed position. It should be appreciated that, although it is not preferred, the seals could be reversed such that a spring seat is mounted on the housing and a fixed seat is mounted on the butterfly disk, for instance, as shown in FIG. 5. With such a configuration as shown in FIG. 5, the curvature of the engagement portion and the entire cross-section of the spring seat would be reversed/flipped from that shown in FIG. 4. Referring back to FIG. 4, in the preferred embodiment, the cross-section of the mounting portion (38) of the spring seat (36) has a periphery that forms a partial circle. The mounting portion (38) of the spring seat (36) also comprises an annular groove (44) that sweeps around the center axis of the spring seat and holds a polymeric O-ring (not shown). The mounting portion (38) of the spring seat (36) is configured to attach the spring seat to the butterfly disk (24). Preferably, two annular mounting rings (46) are provided that interface with the mounting portion (38) of the spring seat (36) and are bolted together and to the main body (48) of the butterfly disk (24) to thereby attach the spring seat to the butterfly disk. Preferably threaded rods (50) and cooperating threaded nuts (52) are used for such bolting. During assembly, the threaded rods (50) can be threaded into the main body 48 of the butterfly disk (24). After doing so, the downstream mounting ring (46) (which comprises circumferentially spaced through holes) is slid in place over the rods (50). Each of the mounting rings (46) comprises an annular engagement surface (54) that is contoured to mate against the circular cross-section part of the mounting portion (38) of the spring seat (36). Following the mounting of the downstream mounting ring (46) to the main body (48) of the butterfly disk (24), the spring seat (36) is then assembled against the downstream mounting ring (38), with the mounting portion (38) of the spring seat resting against the engagement surface (54) of the downstream mounting ring. Following that, the upstream mounting ring (46) (which comprises circumferentially spaced through holes) is slid in place over the rods (50) and against the downstream mounting ring and the mounting portion (38) of the spring seat (36), with the engagement surface (54) of the upstream mounting ring contacting the mounting portion. Finally, the nuts (52) are threaded onto the rods (50), thereby clamping the mounting rings (46) to each other and to the main body (48) of the butterfly disk (24) and securing the spring seat (36) to the main body of the butterfly disk.

In operation, as the butterfly disk (24) closes, the engagement portion (40) of the spring seat (36) annularly moves into contact with the engagement surface (30) of the valve seat (28) of the housing (22) because there is a slight interference fit between them. The interference causes the engagement portion (40) of the spring seat (36) to radially deflect inward under the hoop stress caused by the contact. To minimize bending stress within the spring seat (36) (which could otherwise fatigue the spring seat), the mounting portion (38) slideably pivots (i.e., its cross section pivots) within the annular recess formed by the engagement surfaces (54) of the mounting rings (46). In other words, the spring seat (36) twist about itself slightly with a motion similar to the way a smoke ring twist as air passes through its center. It should be appreciated that this slight articulation has a large impact on the radial resiliency of the engagement portion (40) of the spring seat (36).

Figure 4:
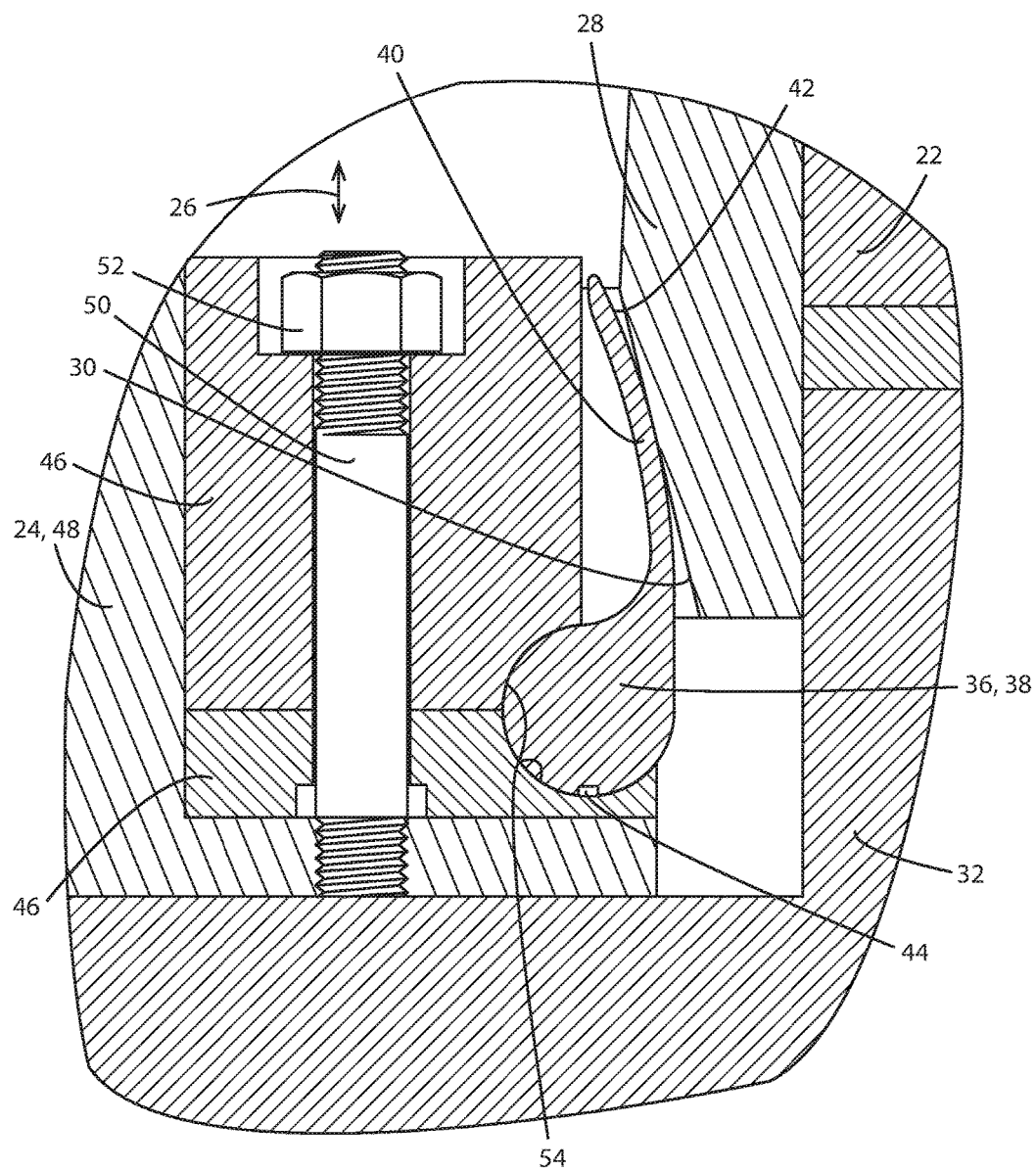
FIG. 4 is a detail view of FIG. 3 showing the cross-section of the spring seat of the butterfly disk more clearly.
Figure 5:
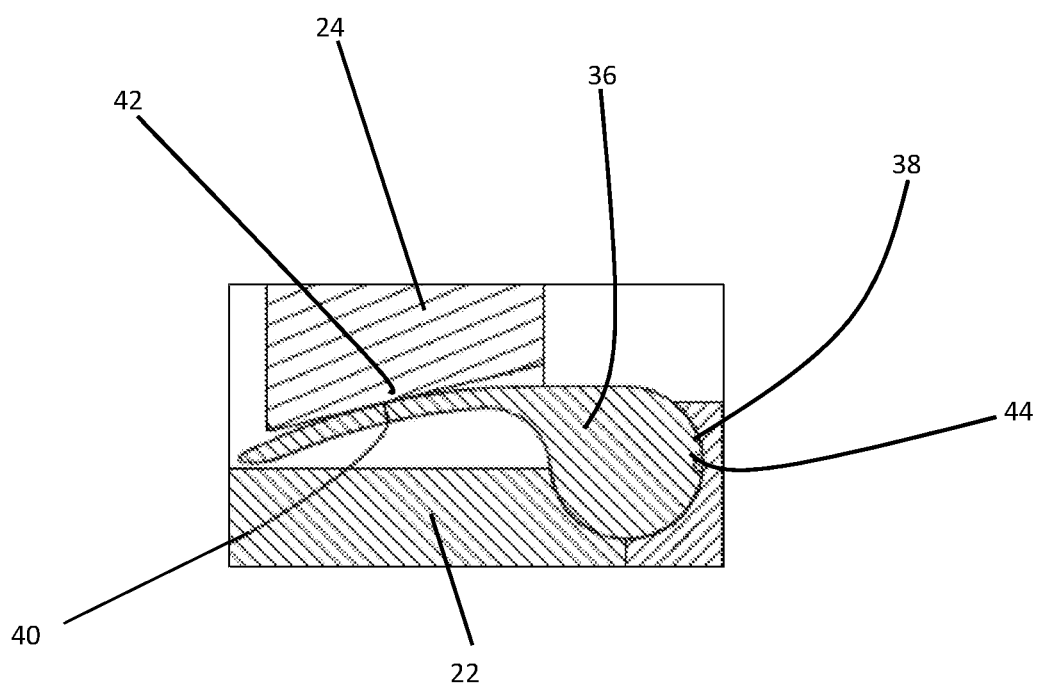
FIG. 5 is alternate embodiment showing the cross-section of the spring seat mounted in a valve housing abutting a butterfly disk.

In the fully closed position (as shown in FIG. 4), the engagement portion (40) of the spring seat (36) is in contact with the engagement surface (30) of the valve seat (28) of the housing (22) at a location that is approximately halfway along the axial length of the engagement portion. Notably, the entire opposite radial side of the engagement portion (40) remains exposed to the fluid pressure upstream of the valve (20). Thus, when the valve is closed, a pressure differential will occur and the fluid pressure will radially force the engagement portion (40) of the spring seat (36) against the engagement surface (30) of the valve seat (28) of the housing (22). It should be appreciated, that the O-ring in the O-ring groove (44) of the mounting portion (38) of the spring seat (36) will prevent any fluid from passing through (as opposed to around) the annular spring seat.

In view of the foregoing, it should be appreciated that the invention has several advantages over the prior art.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

It should also be understood that when introducing elements of the present invention in the claims or in the above description of exemplary embodiments of the invention, the terms "comprising," "including," and "having" are intended to be open-ended and mean that there may be additional elements other than the listed elements. Additionally, the term "portion" should be construed as meaning some or all of the item or element that it qualifies. Moreover, use of identifiers such as first, second, and third should not be construed in a manner imposing any relative position or time sequence between limitations. Still further, the order in which the steps of any method claim that follows are presented should not be construed in a manner limiting the order in which such steps must be performed, unless such an order is inherent.

What is claimed is:

1. A butterfly valve comprising:
a housing, the housing comprising a main body and an annular valve seat, the housing defining a fluid passageway that extends through the main body and the valve seat; and
a butterfly disk, the butterfly disk comprising a main body and an annular valve seat, the butterfly disk being pivotally mounted to the housing such that the butterfly disk is movable to and between an open position and a closed position, the butterfly disk being configured to prevent fluid from passing through the fluid passageway of the housing when the butterfly disk is in the closed position;
wherein at least one of the valve seats is a spring seat having a cross-section that sweeps three-hundred and sixty degrees about an axis, the spring seat having an annular mounting portion and an axially opposite annular engagement portion, the engagement portion being configured to contact the other of the valve seats and resiliently deform radially under hoop stress caused by the contact as the butterfly disk moves to the closed position, the engagement portion being connected to the main body of the respective one of housing or the butterfly disk by the mounting portion, the mounting portion having an annular protrusion with a semi-circular cross-section, the mounting portion being attached to the main body of the respective one of the housing or the butterfly disk via the annular protrusion in a manner such that the mounting portion can articulate relative to the main body of the respective one of housing or the butterfly disk as the engagement portion resiliently deforms radially, the main body of the respective one of the housing or the butterfly disk comprising an annular recess having a semi-circular cross-section, the annular recess semi-circular cross section receiving the mounting portion annular protrusion in attaching the mounting portion to the main body of the respective one of the housing or the butterfly disk.

2. A butterfly valve in accordance with claim 1 wherein, in the cross-section, the engagement portion of the spring seat is elongate and arcuate.

3. A butterfly valve in accordance with claim 1 wherein the spring seat is connected to the butterfly disk for movement therewith relative to the housing, and the engagement portion of the spring seat has an exterior surface that is convex in the direction of the axis.

4. A butterfly valve in accordance with claim 1 wherein the mounting portion of the spring seat forms a partial torus, the partial torus of the mounting portion of the spring seat is trapped within the annular recess of the respective one of the housing or the butterfly disk via interlocking geometry, and the engagement portion of the spring seat extends outside of the annular recess.

5. A butterfly valve in accordance with claim 4 wherein the partial torus of the mounting portion of the spring seat comprises an annular groove that extends around the axis and that is configured and adapted to receive an O-ring.

6. An annular valve seat, the valve seat being monolithic and having a solid cross-section that extends three hundred and sixty degrees about an axis, the cross-section comprising a mounting portion and an engagement portion, the engagement portion extending axially in an arcuate and elongate manner from the mounting portion, the mounting portion having at least a semi-circular cross-section and having an outer periphery, the outer periphery of the mounting portion having at least a semi-circular portion;
wherein the engagement portion has a side that faces the axis and a side that faces away from the axis, the side that faces the axis is concave and the side that faces away from the axis is convex, the concave side extends from a first point on the outer periphery of the mounting surface and the convex side extends from a second point on the outer periphery of the mounting surface, the second point being spaced from the first point around the outer periphery of the mounting portion.

7. An annular valve seat in accordance with claim 6 wherein the valve seat comprises an annular groove that extends around the axis and that is configured and adapted to receive a polymeric O-ring.

8. A butterfly valve comprising:
a housing, the housing comprising a main body and an annular valve seat, the housing defining a fluid passageway that extends through the main body and the valve seat;
a butterfly disk, the butterfly disk comprising a main body and an annular spring seat, the butterfly disk being pivotally mounted to the housing such that the butterfly disk is movable to and between an open position and a closed position, the butterfly disk being configured to prevent fluid from passing through the fluid passageway of the housing when the butterfly disk is in the closed position, the main body of the butterfly disk comprising an annular recess having a semi-circular cross-section, the spring seat having an annular mounting portion and an axially opposite annular engagement portion, the engagement portion being configured to contact the valve seat of the housing and resiliently deform radially under hoop stress caused by the contact as the butterfly disk moves to the closed position, the mounting portion comprising an annular protrusion having a semi circular cross-section, the annular protrusion of the mounting portion of the spring seat being at least partially positioned within the annular recess of the main body of the butterfly disk such that the spring seat is secured to the main body of the butterfly disk but can articulate therein.

* * * * *